United States Patent
Marchetto et al.

[11] Patent Number: 5,914,959
[45] Date of Patent: Jun. 22, 1999

[54] DIGITAL COMMUNICATIONS SYSTEM HAVING AN AUTOMATICALLY SELECTABLE TRANSMISSION RATE

[75] Inventors: Rob Marchetto, Burnaby; Claudio Rey, Port Moody, both of Canada

[73] Assignee: Glenayre Electronics, Inc., Charlotte, N.C.

[21] Appl. No.: 08/743,983

[22] Filed: Oct. 31, 1996

[51] Int. Cl.[6] ............................................ H04J 3/16
[52] U.S. Cl. .................................. 370/468; 455/67.1
[58] Field of Search ............................ 370/311, 317, 370/318, 332, 333, 377, 465, 468, 491, 496, 500; 455/8, 9, 10, 24, 54.2, 63, 67.1, 67.3; 375/225, 227, 377; 371/5.1, 5.5

[56] References Cited

U.S. PATENT DOCUMENTS

| | | |
|---|---|---|
| 3,534,264 | 10/1970 | Blasbalg et al. . |
| 4,589,111 | 5/1986 | Adachi . |
| 4,918,437 | 4/1990 | Jasinski et al. . |
| 4,953,180 | 8/1990 | Fieschi et al. . |
| 4,991,184 | 2/1991 | Hashimoto . |
| 5,105,423 | 4/1992 | Tanaka et al. . |
| 5,168,493 | 12/1992 | Nelson et al. . |
| 5,170,487 | 12/1992 | Peek . |
| 5,199,061 | 3/1993 | Kim . |
| 5,257,019 | 10/1993 | Schwendeman et al. . |
| 5,426,646 | 6/1995 | Slack ........................................ 371/5.1 |
| 5,603,088 | 2/1997 | Gorday et al. .......................... 455/67.1 |

*Primary Examiner*—Ajit Patel
*Assistant Examiner*—Chiho Andrew Lee
*Attorney, Agent, or Firm*—Christensen O'Connor Johnson & Kindness PLLC

[57] ABSTRACT

A system and method for maintaining communication between a paging base station (transceiver) and a mobile paging unit when signal reception is below a level that would otherwise be unacceptable. The system changes from one data transmission rate to another depending upon the quality of the communication channel. In particular, the symbol rate of the transmissions remains the same, but the number of modulation states and bits per symbol is decreased or increased depending upon the bit error rate of the received signal. In some arrangements, the transceiver transmits at the highest bit rate for that particular system. If no response is received from the paging unit or the paging unit sends a response signal back to the transceiver indicating the signal sent is unacceptable, the transceiver retransmits at a lower bit rate. In other arrangements, the receiver determines the highest data rate within the group of data rates available and transmits a signal representative of that data rate to the base station. In response to such a signal, the base station transmits at the requested data rate until a different data rate is requested.

6 Claims, 5 Drawing Sheets

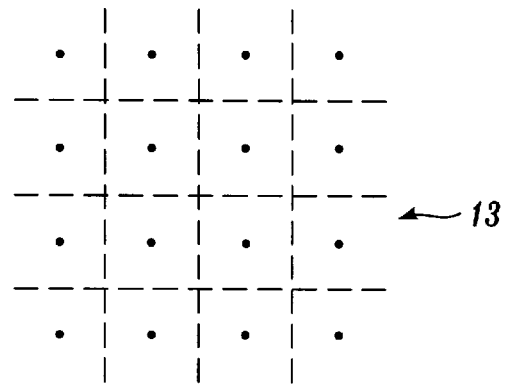
Fig. 1B.   16QAM
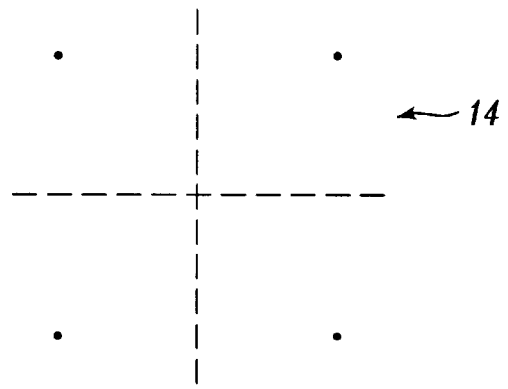
Fig. 1C.   QPSK
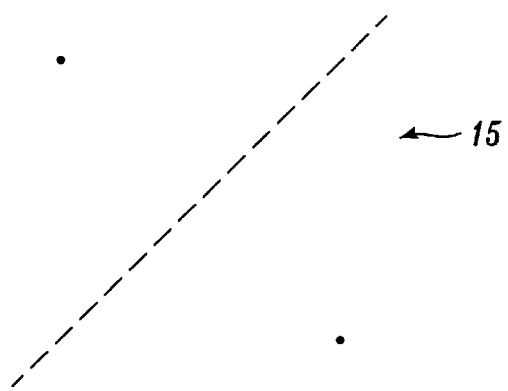
Fig. 1D.   BPSK

DIGITAL COMMUNICATIONS SYSTEM HAVING AN AUTOMATICALLY SELECTABLE TRANSMISSION RATE

FIELD OF THE INVENTION

The present invention relates to a variable-rate communication system that switches to a lower transmission rate during periods of poor reception. More particularly the present invention is directed to a system for transmitting signals from a paging transceiver (base station) to a paging unit in a manner that automatically compensates for inadequate signal quality.

BACKGROUND OF THE INVENTION

High-speed data transmission has become very important in the business communication environment. Designers of this technology have combined modulation techniques to obtain very high-speed data transmission over simple voice-grade telephone lines. These systems have reached data transmission rates well into the tens of thousands of bits per second.

High speed data transmission also is very important in the field of paging systems where various problems are encountered. For example, as a paging receiver moves farther away from the transmitting base station, the average received power gradually degrades to a point where the bit error rate (BER) at the pager is too high for efficient communication. Various attempts have been made to develop paging products with improvements relative to complexity (size), range and cost to thereby provide the highest level of service at marketable prices.

One way to reduce the bit error rate is to simply retransmit or provide higher powered transmitters. However, there is little guarantee that the retransmission will work and high powered transmitters are very costly.

Another more advanced technique used is a retransmission scheme titled multiple forward error correction (FEC). Multiple FEC schemes code transmission more "heavily" when the signal-to-noise ratio (SNR) becomes poor. In other words, less data is sent but more error correcting bits are sent per data bit. This means that the data bits are better protected against errors. However, FEC schemes result in relatively poor performance at low SNR.

Another scheme is the multiple transmission speed scheme. This scheme reduces the data transmission rate as the SNR becomes poor to ensure that the BER remains high. However, the front end of this receiver must accommodate this change in data transmission rate and therefore becomes unnecessarily complex and expensive.

The systems described above are inconsistent in their performance and also are unnecessarily complicated and expensive.

SUMMARY OF THE INVENTION

The present invention provides for the automatic retransmission of signals at a lower transmission rate when the quality of the signal received by a receiver is below an acceptable level. The automatic retransmission is performed at the same symbol rate but uses fewer modulation states, with the constellation used for retransmission preferably being a subset of the constellation points used for transmission at a higher data rate.

In the invention, a base transmitter transmits a data signal using an initial set of constellation points. The data stream is divided into a series (sequence) of frames that each contain a pilot symbol block and information symbols. A mobile receiver receives the data signal and passes it through a demultiplexer that separates the pilot symbol blocks from the information symbols. A pilot symbol block processor in the receiver receives the separated pilot symbol blocks on a frame-by-frame basis. Each received pilot symbol block consists of a predetermined sequence of pilot symbols that was established by the transmitter. The pilot symbol sequence used by the transmitter is stored in the receiver, so that the pilot symbol block processor in effect knows what the pilot symbol block pattern should be. By comparing the known pilot symbol block pattern to the received pilot symbol block pattern, the pilot symbol block processor produces a quality value that is indicative of the receiver bit error rate or some other parameter that is representative of reception quality. In a two-way paging system, a back-off signal is generated and sent to the system transmitter if the quality signal indicates that the received data signal is unacceptable according to a predetermined threshold. In response to the backoff or retransmission signal, the system transmitter retransmits the same information at a lower data rate, using modulation in which the signal constellation is a subset of the constellation used in the original transmission. On the other hand, if the quality signal indicates that the received data signal is acceptable, the transmitter sends the next data signal at the same data rate and a demodulator processes the received information symbols in a conventional manner.

In accordance with other aspects of the present invention, the pilot symbol block processor selects an acceptable constellation pattern rate and generates an acceptable constellation pattern rate signal representative of the selected acceptable constellation pattern rate. The base transmitter transmits a subsequent frame of the data stream using the acceptable constellation pattern rate if the acceptable constellation pattern rate is not the same as the constellation pattern rate of the data signal most recently processed by the pilot block processor.

In accordance with yet other aspects of the present invention, the base transmitter can be arranged to retransmit the data stream at a lower constellation pattern rate if the base transmitter fails to receive any response corresponding to the signal from the mobile receiver.

In accordance with still other aspects of the present invention, the system may transmit each symbol twice in succession to achieve additional tolerance to weak and noisy reception. The symbol rate and the data rate are reduced without any change or adjustment of the receiver front end. This improves intelligibility by allowing averaging of the received signal over a longer period which allows a better estimate to be made of the transmitted symbol by the receiver.

In accordance with still yet other aspects of this invention, a receiver establishes the initial constellation pattern rate and transmits it to the transmitter. This allows the receiver to initially determine an acceptable initial constellation pattern rate.

Receivers of the present invention also can be used advantageously with one-way paging systems. In particular, the pagers can receive data from a base station in one geographic region with the data being encoded with a particular constellation pattern and rate. When located in a different geographic region, the pager can also receive data from a base station that uses a different constellation pattern, with the only limitation being that one of the constellations be a subset of the other. One-way paging with the receivers of the invention would be useful to provide service over an extended area where paging traffic is lighter using fewer transmitters. Moreover, a pager configured in accordance with the invention could receive transmissions from a base station in a city at a high rate and a rural base station at a lower rate. Any pager which finds itself close to the rural base station would itself be capable of receiving at a higher rate with an extended area of coverage if a lower rate is used with the rural base station.

In accordance with the invention, the pilot symbol block is encoded to identify the constellation pattern of the received signal so that the demodulation process is established with the proper processing rate (clock rate). In some situations, the system data frame can be subdivided into two pilot symbol blocks and two blocks of information symbols. For example, in a system using two constellation patterns (e.g., 16 QAM and BPSK), the subdivided pilot block would allow encoding to designate four demodulation combinations, i.e., (BPSK, BPSK), (BPSK, 16 QAM), (16 QAM, BPSK), and (16 QAM, 16 QAM) for each subdivided block of information symbols.

It can be noted that each embodiment of the invention provides a more efficient paging system. Battery life is longer because less time and energy are wasted demodulating unacceptable signals. Demodulation occurs when the signal is acceptable. However, if the signal is not acceptable, the demodulation rate is changed in the receiver according to the received constellation pattern or a signal is sent to the transmitter to retransmit at an acceptable modulation pattern.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 1B–1D depict some of the various constellation patterns that can be used in the practice of this invention;

DETAILED DESCRIPTION OF THE PREFERRED EMBODIMENT

Figure 1A:
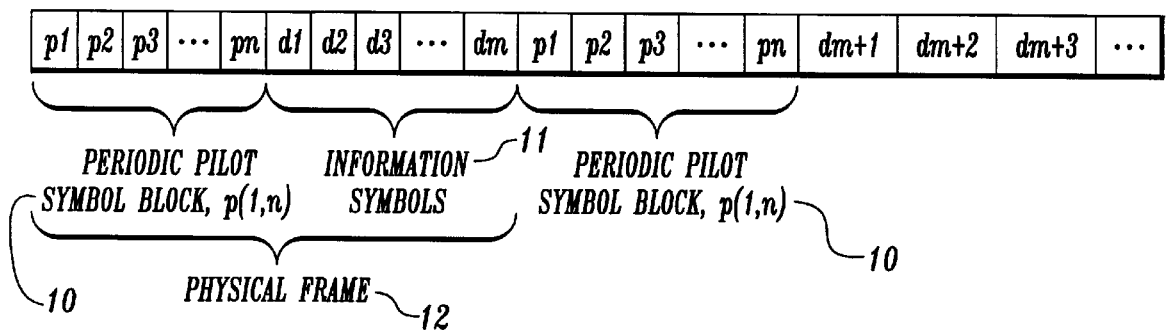
FIG. 1A represents a section of the symbol sequence of a signal sent by the transmitter of this invention.

The present invention provides for the automatic retransmission of signals at a lower transmission rate when the quality of the signal received by a receiver is below an acceptable level. FIG. 1A depicts the data stream sent from the transmitter to the receiver. As is shown in FIG. 1A, the data stream is divided into a sequence of frames 12. Each frame includes a pilot symbol block (each consisting of a sequence of pilot symbols) 10 and a sequence of information symbols each representing one or more data bits 11. The sequence of pilot symbols within a pilot symbol block is a specific predetermined pattern and, thus, is known to the receiver.

Figure 2:
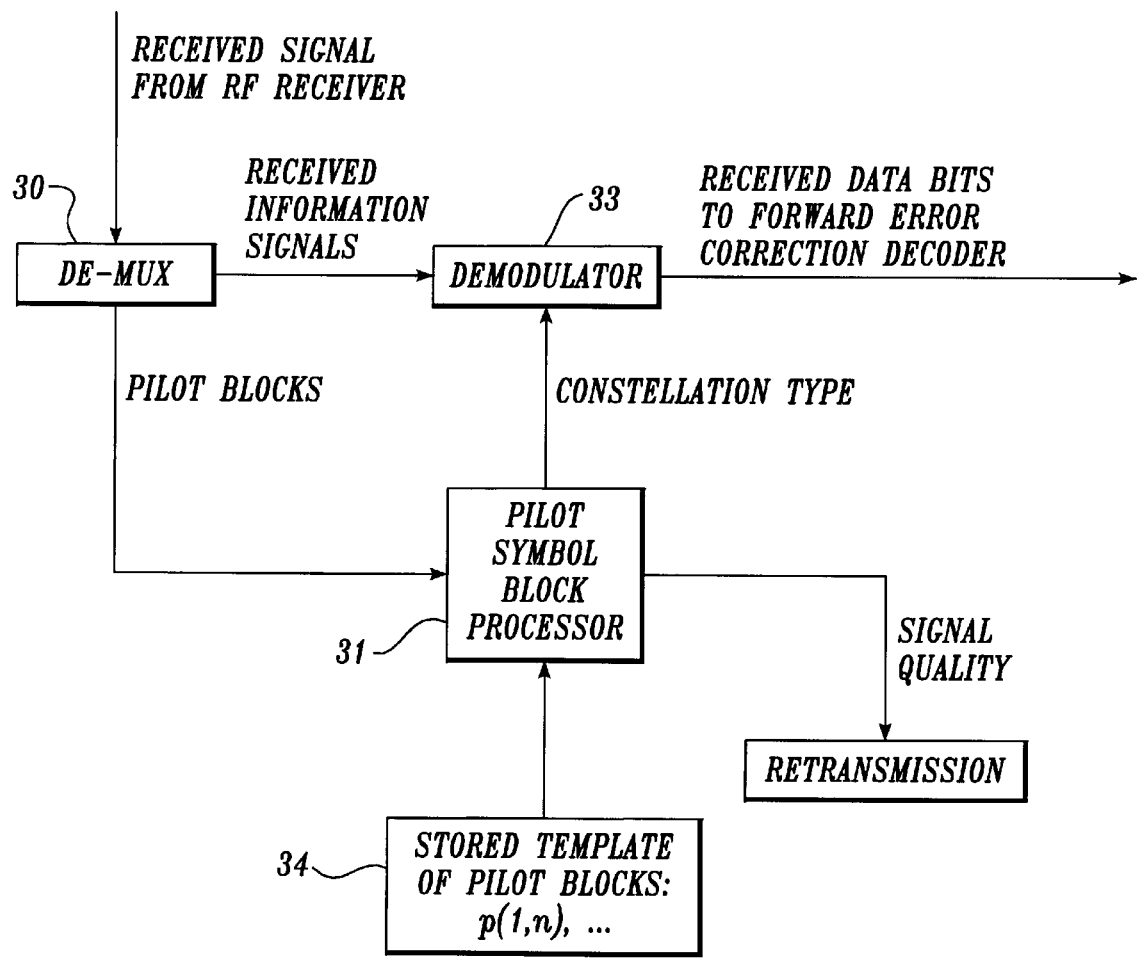
FIG. 2 is a block diagram of a receiver arranged in accordance with this invention.
Figure 3:
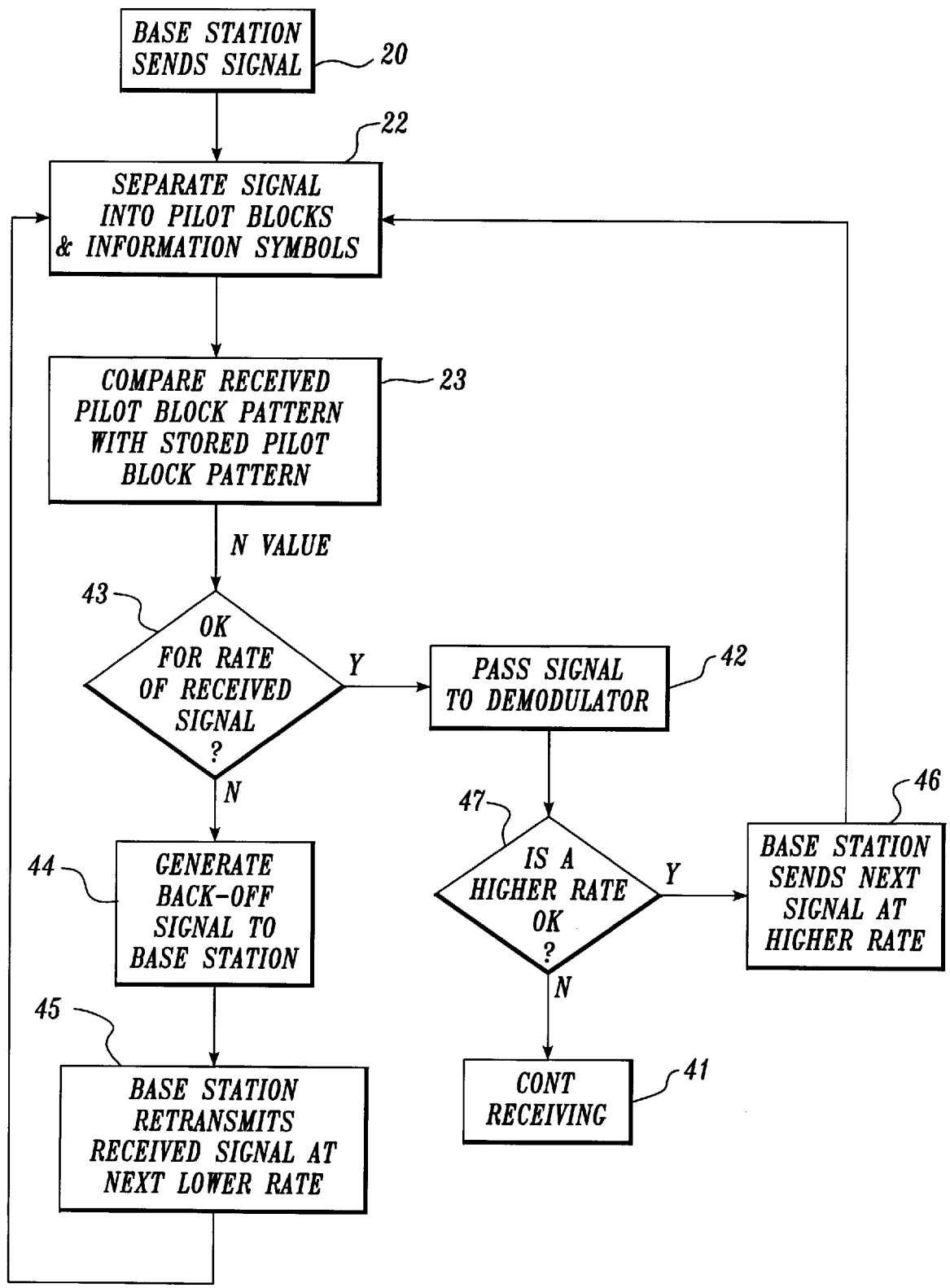
FIGS. 3–5 are exemplary flow diagrams of the decision process and data flow in this invention.

FIGS. 2 and 3 illustrate operation of the invention within a paging system or other environments that employ mobile receivers. First the transmitter sends the signal to the receiver using an initial constellation pattern and bit rate (indicated at block 20 in FIG. 3). The initial constellation bit rate is known to the receiver and is considered a default after prolonged periods of inactivity in the system. Then, the receiver's demultiplexer 30 (FIG. 2) processes the received signal to separate the pilot symbol blocks 10 and the sequence of information symbols 1 (indicated at block 22 in FIG. 3).

The invention uses a subset of the same constellation points when reducing rate. The change of rate involves using fewer points with greater separation between the points to achieve higher noise immunity. To initiate a rate change, the invention uses a decision threshold located between the constellation points. As noise increases, the points corresponding to demodulated data become indistinct and there is an increased possibility that a received symbol will be incorrectly detected as an adjacent symbol of the constellation pattern. Using fewer points in the constellation places the thresholds further from the constellation points, allowing more noise before an error is produced.

In the signal processing method of the invention, the receiver clock rate is unchanged, as is the receiver filtering, which avoids the need for switching between multiple filters in the receiver. This contrasts with older schemes which require a separate receiver filter for each data rate. The front end of the receiver is the same for all of the rates when the system uses one or more subsets of the same constellation pattern and a constant receiver clock rate. For example, the highest constellation pattern and data rate can be established with 16-ary quadrature amplitude modulation (16 QAM) pattern, see FIG. 1B, with a constellation pattern 13 which includes 16 points. Each point represents a 4 data bit modulation state and each tick of the symbol transmission clock sees the transmitted signal pass one of the points as a symbol of the data stream shown in FIG. 1A. Improved reception under increased noise conditions can be achieved relative to the 16 QAM modulation indicated in FIG. 1B by switching or backing off to a QPSK modulation that uses the four corner symbols of the 16 QAM constellation pattern 13. Such a QPSK modulation pattern 14 is shown in FIG. 1C. When an embodiment of the invention switches to QPSK modulation, the symbol clock remains constant. However, since each symbol in QPSK modulation consists of two data bits, the data rate is halved. It should be noted that, since corner points of the 16 QAM constellation 13 are being used as the symbols of the QPSK constellation pattern, operation of the receiver front end is not affected by the new data rate. To accommodate even more severe noise conditions (or equivalently to increase transmitter range), a system employing the invention can be arranged to switch to an even lower data rate. For example, FIG. 1D depicts a BPSK pattern 15 in which each symbol is encoded with a single data bit. Thus, by using diagonally opposed symbols of the 16 QAM constellation of FIG. 1C, a symbol clock rate can be maintained while the data rate is again halved.

Turning to the block diagram of the invention shown in FIG. 2, a pilot symbol block processor 31 in the receiver is coupled to the demultiplexer 30 for receiving the separated pilot symbol block of each received frame. The processing performed by pilot symbol block processor 31 is generally indicated at block 23 of FIG. 3 and can be expressed mathematically as:

$$|R(k)-R'(k)|^2 = e(k)$$

where $R(k)$ and $R'(k)$ represent the received and known pilot symbol for the kth pilot symbol of the pilot symbol sequence. Thus, the value $e(k)$ corresponds to the square of the pilot symbol error for an individual pilot symbol. The sum of the individual symbol errors for a complete pilot symbol block is given by N.

$$\sum_{k=1}^{n} e(k) = N$$

In the currently preferred embodiments of the invention, the value of N is used to determine whether the transmitter and receiver are operating at a low enough data rate to insure relative reception. In these embodiments, the receiver stores a look-up table (LUT) listing the acceptable N value for each available constellation bit rate. In these embodiments, the system initially operates at the highest available data rate and the value of N determined by the receiver is compared with the acceptable value of N that is stored in the LUT (indicated at block 43 in FIG. 3). If the N value is acceptable at the initial constellation bit rate, the demodulator 33 of FIG. 2 is supplied with the information symbol 11 of the data frame associated with the processed pilot symbols (indicated at blocks 42, 43 in FIG. 3). If the N value is unacceptable at the initial constellation bit rate, a back-off signal can be transmitted to the base transmitter to cause retransmission of the received signal at the next lower bit rate (indicated at blocks 44, 45 in FIG. 3). Processing of the retransmitted signal by the receiver begins again with the next lower bit rate becoming the initial constellation bit rate.

Although satisfactory in some situations, generating a retransmission signal for requesting the next lowest data rate may not result in the most advantageous use of the invention. Specifically, in systems that are configured for operation at more than two data rates, the N value for the next lowest data rate may not be acceptable. In that case, the receiver would not demodulate the information symbols, but would again request retransmission at the next lowest data rate. The transmission of two (or even more) transmissions at a data rate that does not result in an acceptable N value results in less than optimal system efficiency.

To eliminate the possible need for repeated retransmission requests in order to establish an acceptable data rate, the invention can be configured to search the LUT in decreasing data rate order until an acceptable N value is located. In such an embodiment of the invention, an indication of the data rate (or signal constellation) associated with the acceptable N value is included in the signal sent to the system transmitter so that data will be transmitted at a rate that insures reception. For example, in arrangements in which the highest data rate is achieved with 16 QAM modulation, the pilot symbol block processor 31 may determine that the next lowest data rate (e.g., QPSK) will not result in an acceptable N value. In that case, the pilot symbol block processor continues searching the LUT until an acceptable constellation pattern and bit rate is located (e.g., BPSK).

Figure 4:
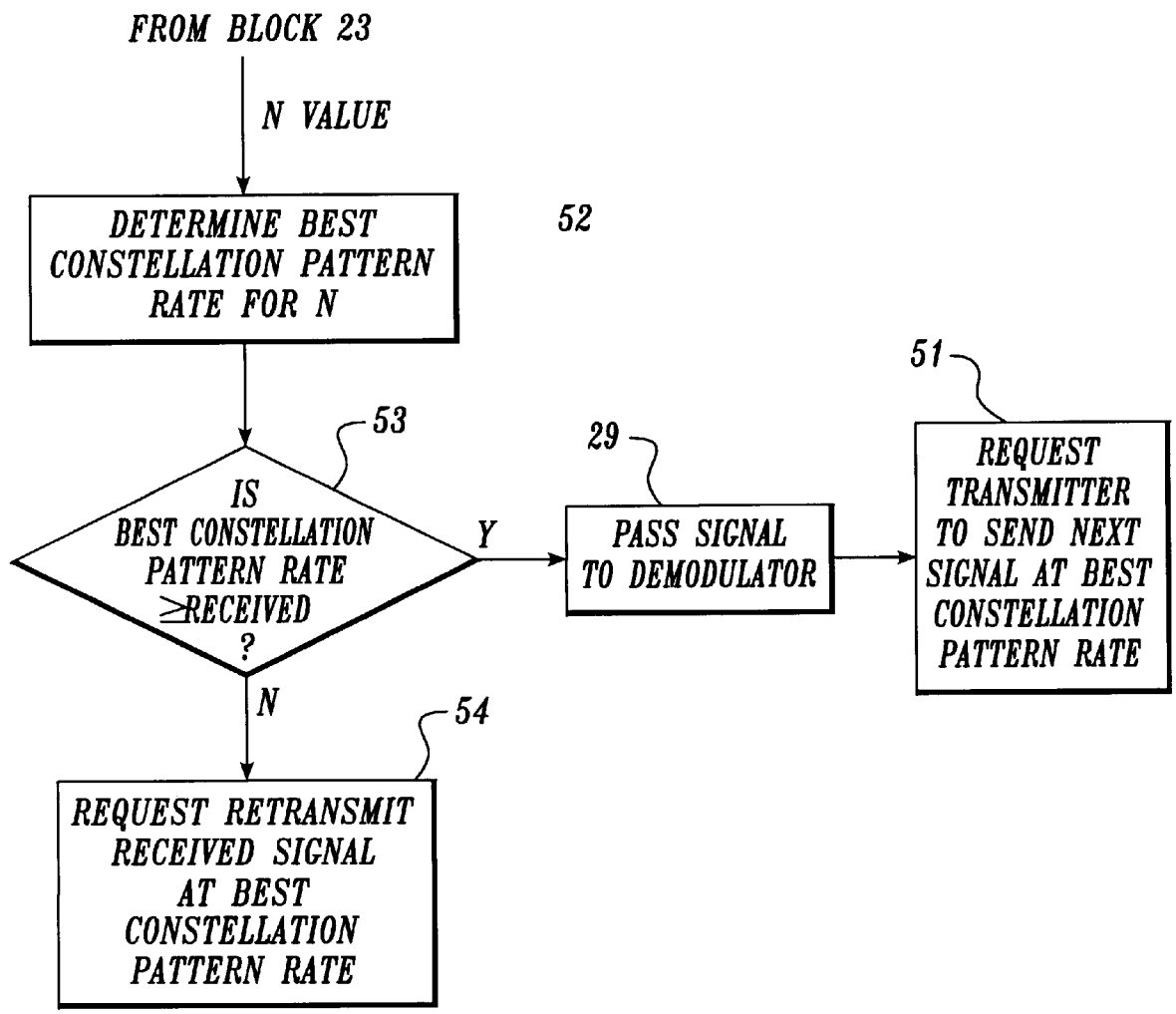

FIG. 4 indicates processing with which the system finds the best possible constellation and bit rate regardless of whether that bit rate is greater or lesser than the data rate of a received signal. In this arrangement, if the receiver, due to poor environment conditions, is operating at a low bit rate then suddenly moves into an area of favorable environmental conditions, the receiver will indicate to the base transmitter that a higher bit rate signal can be accepted.

To locate the best data rate, the processor 31 can perform the LUT search operation in a number of different ways. One way is to always start the look-up function at the highest constellation pattern rate and search in decreasing order of constellation pattern rates until an acceptable constellation pattern rate is discovered (indicated at block 52 in FIG. 4).

Another way is to start the look-up function at the constellation pattern rate that corresponds to the signal being processed by the pilot symbol block processor 31 (FIG. 2). If the initial constellation pattern rate of the received signal is acceptable, the pilot symbol block processor searches the LUT in increasing order of constellation pattern rates until the highest acceptable constellation pattern rate is located (indicated at block 47 in FIG. 3). If the N value for the signal being processed is unacceptable, the LUT is searched in increasing order of constellation pattern rates in the previously described manner. As noted previously, if an acceptable constellation pattern rate higher than the current constellation pattern rate is located, the receiver requests that subsequent data frames be supplied by the base transmitter at the higher rate, thus optimizing system operation. (indicated at block 46 in FIG. 3).

In the arrangement shown in FIG. 2, the pilot symbol block processor 31 typically processes the pilot symbol blocks to also provide a channel impulse response estimate, which is used by the demodulator 33 for equalization of the received information symbols. For example, in the currently preferred embodiment of the invention, decision feedback equalization is employed, with the channel impulse response being used to determine equalizer tap coefficients. Regardless of the type of equalization employed, the demodulator 33 demodulates the signal in accordance with the constellation information received from the pilot symbol block processor 31.

Figure 5:
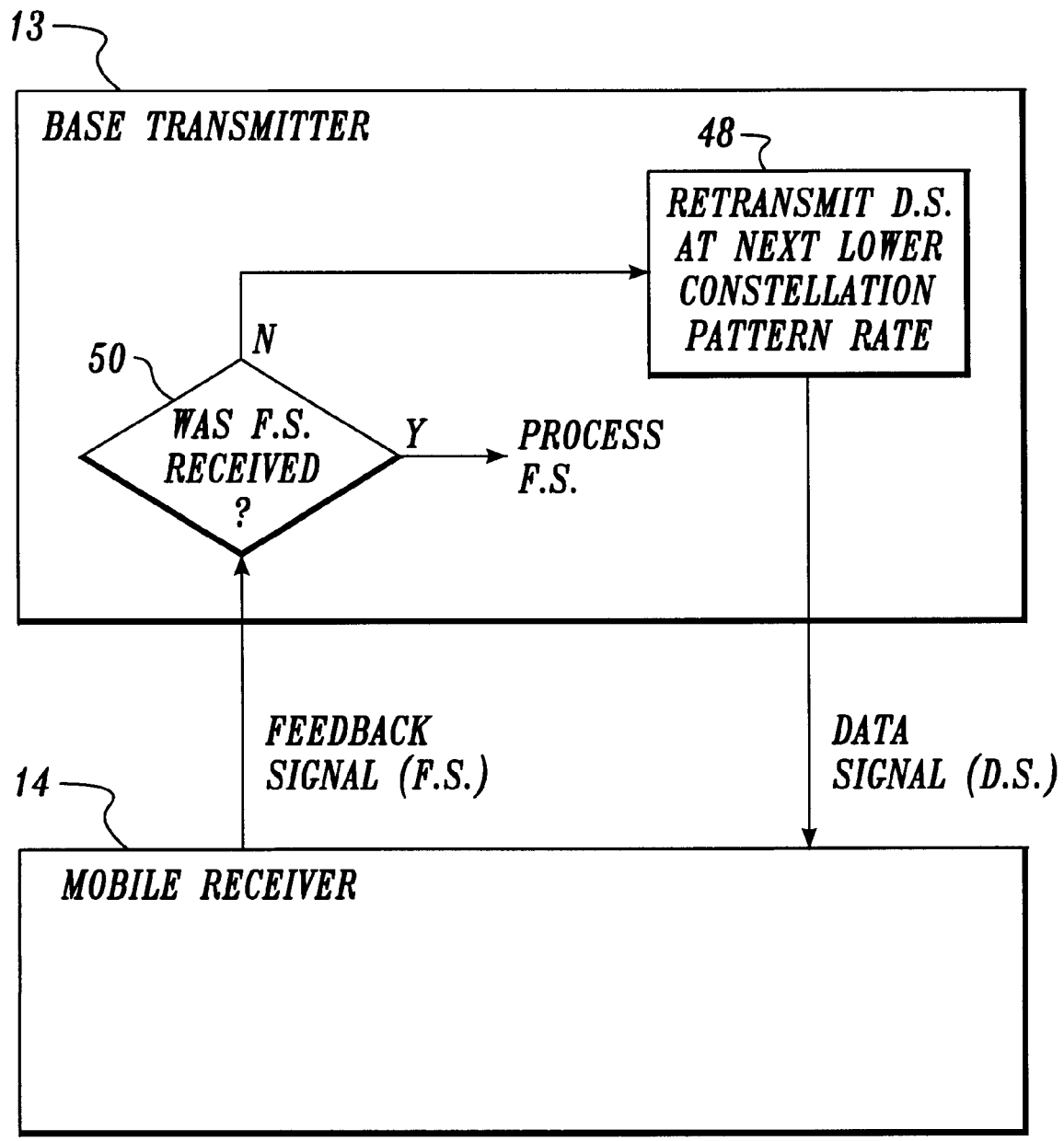

FIG. 5 depicts an arrangement of the invention in which the base transmitter retransmits a previously transmitted signal at a lower bit rate (at block 48) if the base transmitter does not receive a signal from the receiver within a predetermined period of time. The signal sent to the base transmitter by the receiver in this arrangement of the invention (identified in FIG. 5 as a Feedback Signal) can be a retransmission signal of the previously discussed embodiments of the invention or can be a simple receive acknowledgment signal. In any case, the base transmitter automatically responds (at block 50 of FIG. 5) if the feedback signal is not received by retransmitting at a lower bit rate.

It is also possible for the receiver to establish the initial constellation pattern rate. The receiver may retrieve from its memory, or by another determination, a last known or default acceptable constellation pattern rate and transmits this value to the transmitter during start-up. The transmitter transmits at the acceptable constellation pattern rate received from the receiver.

It will be recognized by those skilled in the art that various prior art techniques can be used in combination with the invention. For example, reception will be improved at the lowest data rate for a particular arrangement of the invention by conventional forward error correction techniques.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A variable transmission rate communications system comprising:
 (a) a base transmitter for transmitting a data signal at an initial constellation pattern and bit rate, said data signal being a digitally encoded data stream, that is divided into frames that include pilot symbol blocks and information symbols, said pilot symbol blocks each including a predetermined symbol sequence;
 (b) a mobile receiver including means for receiving said transmitted signal, said mobile receiver further including a demultiplexer for separating said received signal into separate pilot symbol blocks and information symbols, said mobile receiver further including a pilot symbol block processor having:
  (i) means for detecting the symbol sequence of a received pilot symbol block and comparing the detected symbol sequence to the predetermined pilot symbol block sequence used in said transmitted data stream;
  (ii) means for producing a quality signal according to said comparison, said quality signal being representative of the acceptability of said received data signal; and
  (iii) means for generating a back-off signal if said quality signal is below a threshold level indicating that said received data signal is unacceptable and transmitting said back-off signal; and
  (iv) a demodulator for receiving said information symbols, if said quality signal indicates the received data signal is acceptable; and
(c) a retransmission means located in said base transmitter for retransmitting the data signal at a next lower constellation pattern rate if said back-off signal is received from said mobile receiver, said backoff indicating that said received data signal has a quality level below said threshold level.

2. The system according to claim 1, wherein said mobile receiver further includes means for establishing and transmitting said initial signal representative of an initial constellation pattern rate expected by said receiver.

3. The system according to claim 1, wherein said retransmission means retransmits said data signal at the next lower constellation pattern rate if the base transmitter fails to receive an acceptable constellation pattern rate signal after a preset period of time.

4. A variable transmission rate communications method comprising the steps of:
  (a) transmitting from a base transmitter a data signal at an initial constellation pattern rate, said data signal being a digitally encoded data stream, that is divided into frames that include pilot symbol blocks and information symbols, said pilot symbol blocks each including a predetermined symbol sequence;
  (b) receiving at a mobile receiver said transmitted signal;
  (c) separating said received signal into separate pilot symbol blocks and information symbols;
  (d) detecting the symbol sequence of a received pilot symbol block and comparing that symbol sequence to said predetermined pilot symbol block sequence;
  (e) producing a quality signal according to said comparison, said quality signal being representative of the acceptability of said received data signal;
  (f) generating a back-off signal if said quality signal is below a threshold level indicating that said received data signal is unacceptable;
  (g) transmitting said back-off signal to the base transmitter;
  (h) supplying said information symbols to a demodulator if said quality signal indicates the received data signal is acceptable; and
  (i) retransmitting from said base transmitter the data signal at the next lover constellation pattern rate if said back-off signal is received, said backoff signal indicating that said received data signal has a quality level below said threshold level.

5. The method according to claim 4, further comprising the step of establishing and transmitting from said mobile receiver said initial signal representative of an initial constellation pattern rate expected by said receiver.

6. The method according to claim 5, wherein said step of retransmitting includes retransmitting said data signal at a next lower constellation pattern rate if the base transmitter fails to receive an acceptable constellation pattern rate signal after a preset period of time.

\* \* \* \* \*

UNITED STATES PATENT AND TRADEMARK OFFICE
CERTIFICATE OF CORRECTION

PATENT NO. : 5,914,959
DATED : June 22, 1999
INVENTOR(S) : R. Marchetto et al.

It is certified that error appears in the above-identified patent and that said Letters Patent is hereby corrected as shown below:

| COLUMN | LINE | |
|---|---|---|
| [56]<br>Pg. 1, cols. 1-2 | Refs. Cited<br>(U.S. Patents) | Please insert the following references:<br>--5,400,024   3/1995   Nishimura et al.<br>5,612,975   3/1997   Becker et al.<br>5,623,512   4/1997   Sasaki-- |
| 8<br>(Claim 4, | 12<br>line 15) | "(c) producing" should read --(e) producing-- |
| 8<br>(Claim 4, | 25<br>line 27) | "lover" should read --lower-- |

Signed and Sealed this

Thirty-first Day of October, 2000

Attest:

Attesting Officer

Q. TODD DICKINSON

Director of Patents and Trademarks